United States Patent [19]

Mizutani et al.

[11] Patent Number: 4,987,106
[45] Date of Patent: Jan. 22, 1991

[54] PROCESS FOR PRODUCING CLAY MINERAL OF CHAIN STRUCTURE

[75] Inventors: Tadashi Mizutani; Yoshiaki Fukushima; Haruo Doi; Osami Kamigaito, all of Aichi, Japan

[73] Assignee: Kabushiki Kaisha Toyota Chuo Kenkyusho, Aichi, Japan

[21] Appl. No.: 457,835

[22] Filed: Dec. 27, 1989

[30] Foreign Application Priority Data

Dec. 27, 1988 [JP] Japan .................. 63-330810

[51] Int. Cl.$^5$ .................. C04B 33/00; C04B 33/02
[52] U.S. Cl. .................. 501/147; 423/331; 423/333; 501/146; 502/80; 502/84
[58] Field of Search .................. 501/148, 147, 150; 106/469; 423/331, 333, 326; 502/80, 84, 251; 581/146

[56] References Cited

U.S. PATENT DOCUMENTS

| 2,318,753 | 5/1943 | Carter | 501/148 |
| 4,676,929 | 6/1987 | Rittler | 501/148 |
| 4,715,987 | 12/1987 | Rittler | 501/148 |
| 4,777,206 | 10/1988 | Rittler | 501/148 |

Primary Examiner—William R. Dixon, Jr.
Assistant Examiner—Paul Marcantoni
Attorney, Agent, or Firm—Oblon, Spivak, McClelland, Maier & Neustadt

[57] ABSTRACT

A process for producing a clay mineral of chain structure such as sepiolite and attapulgite. The process comprises suspending a metal silicate gel in an aqueous solution which has a pH value of 3–11 at room temperature and contains a clay mineral of chain structure suspending therein, and then heating the resulting suspension at a temperature below 350° C. According to this process, it is possible to produce a clay mineral of chain structure in a simple, stable manner.

14 Claims, 1 Drawing Sheet

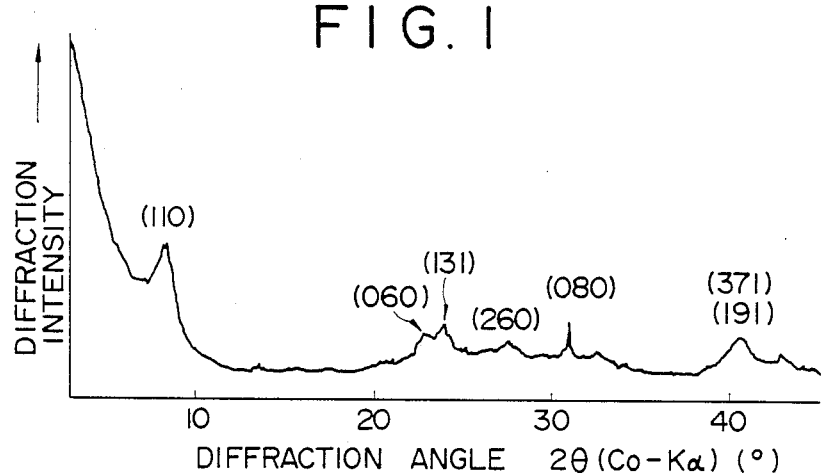
F I G. 1
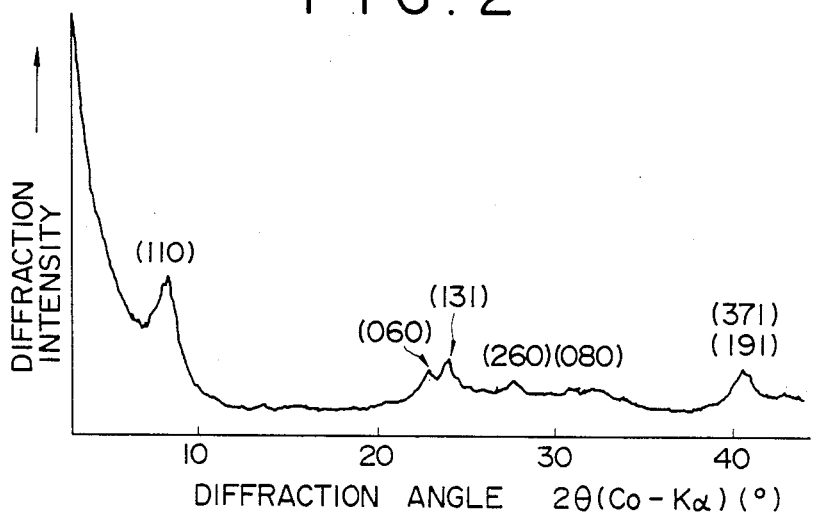
F I G. 2
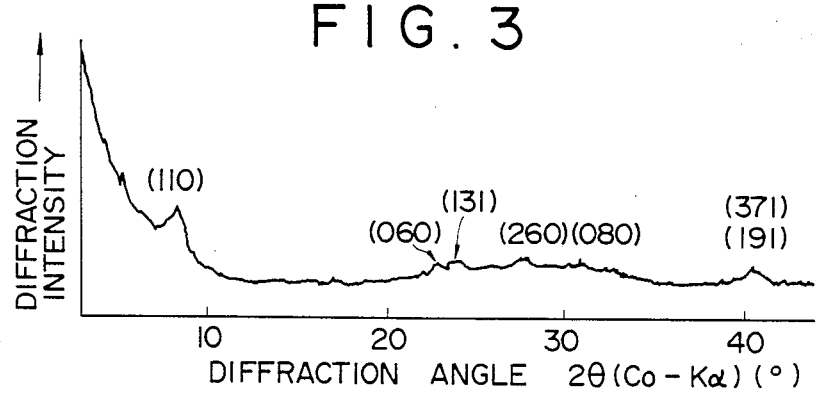
F I G. 3

PROCESS FOR PRODUCING CLAY MINERAL OF CHAIN STRUCTURE

BACKGROUND OF THE INVENTION

1. Field of the Invention

The present invention relates to a process for producing in a simple manner a clay mineral of chain structure such as sepiolite and attapulgite.

2. Description of the Related Art

A clay mineral of chain structure such as sepiolite and attapulgite finds use as, for example, a catalyst for chemical reactions, an adsorbent for chromatography, a membrane for separating various mixtures, and a rheology controlling material.

Sepiolite is a fibrous clay mineral represented by the general formula below.

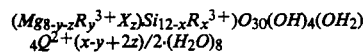

where R denotes at least one member selected from Al and Fe; Q denotes Ca; X denotes a lattice defect; and x, y, and z denote the substitution of tetrahedral ion, the substitution of octahadral ion, and the defect of octahedral ion, respectively.

It has channels (measuring 3.7 Å×9.3 Å) running parallel to the direction of the fiber. In these channels are bound water molecules coordinating to $Mg^{2+}$. Owing to this structure, sepiolite is used as an adsorbent and drilling mud for geothermal exploitation.

The clay mineral of chain structure now in use is of natural origin because of difficulty in its synthesis. However, there are some reports on the synthesis. According to B. Siffert and R. Wey (*Comptes rendes* vol. 254, pp. 1460–1464, 1962), sepiolite is synthesized when sodium hydroxide is added to silicic acid and magnesium chloride, followed by standing at room temperature for 3 weeks. The reaction product formed in this manner is mostly amorphous and sepiolite would be very small in quantity even though it should occur. N. I. Nesterchuk and T. A. Makarova reported a process of synthesizing sepiolite by the reaction of magnesium chloride with sodium metasilicate, followed by the heat treatment in an autoclave at 250° C. for 3–5 hours. (*Zap. Vses. Mineral Obshchest*, 1973, 102(2), 232–4) This process, however, merely yields a product of poor crystallinity as indicated by powder X-ray diffraction. Thus it is difficult to produce sepiolite efficiently.

SUMMARY OF THE INVENTION

The present invention was completed to address the above-mentioned problems. Accordingly, it is an object of the present invention to provide a process for producing in a simple manner a clay mineral of chain structure such as sepiolite.

The gist of the present invention resides in a process for producing a clay mineral of chain structure which comprises suspending a metal silicate gel in an aqueous solution which has a pH value of 3–11 at room temperature and contains a clay mineral of chain structure suspending therein, and then heating the resulting suspension at a temperature below 350° C.

The process of the present invention makes it possible to produce clay minerals of chain structure in a simple, stable manner. Therefore, it permits the commercial synthesis of clay minerals of chain structure. Moreover, it can be used for the modification of natural clay minerals of chain structure.

The above and other objects, features and advantages of the present invention will become more apparent from the following description when taken in conjunction with the accompanying drawings in which a preferred embodiment of the invention is shown by way of illustrative example.

BRIEF DESCRIPTION OF THE DRAWINGS

FIG. 1 is a chart of powder X-ray diffraction of the product in Example 1.

FIG. 2 is a chart of powder X-ray diffraction of the product in Example 2.

FIG. 3 is a chart of powder X-ray diffraction of the product in Comparative Example 2.

DETAILED DESCRIPTION OF THE INVENTION

According to the process of the present invention, a clay mineral of chain structure is produced by the epitaxial crystal growth of a metal silicate gel that takes place under specific conditions required for the synthesis of a clay mineral of chain structure.

Natural sepiolite is not necessarily stable under the condition of ordinary hydrothermal treatment. In other words, it is decomposed in the presence of sodium fluoride used as a mineralizer or phosphate or borate ions used as a buffer. However, it is comparatively stable in an aqueous solution of magnesium chloride. In such an aqueous solution natural sepiolite permits a metal silicate gel to grow into crystals thereon. In fact, it is known that magnesium silicate gel having the Si/Mg ratio of 1.5–3.0 grows into fibrous crystals when subjected to hydrothermal treatment at 200° C. This suggests that the crystal growth of sepiolite easily takes place by hydrothermal treatment under this condition. Therefore, it is considered that sepiolite will grow efficiently if the reaction is performed under the above-mentioned conditions in a suspension containing natural sepiolite as a seed.

According to the process of the present invention, a clay mineral of chain structure is efficiently produced by subjecting a metal silicate gel to hydrothermal treatment under the condition required for a clay mineral of chain structure to be stable in such a manner that the metal silicate gel grows into crystals on a clay mineral of chain structure which has previously been added as a seed. The hydrothermal treatment is performed at 350° C. or below and pH 3–11 measured at room temperature (25° C.).

The clay mineral of chain structure is a 2:1 layer silicate composed of one octahedral sheet sandwiched by two tetrahedral sheets of silica. It has a rectangular channels running in the axial direction of the chain because the ribbons like layers are linked to each other at their corners. Examples of such a clay mineral of natural origin include sepiolite and attapulgite and so on.

In the process of the present invention, a metal silicate gel is a precursor for the synthesis of a clay mineral of chain structure. It includes, for example, magnesium silicate gel and aluminum silicate gel and so on. At least one of them is used in the present invention. A preferred example is one which is represented by the formula $SiM_xO_{2+nx/2} \cdot yH_2O$ (where M denotes a metal element which takes on the six-coordination, e.g., at least one member selected from Mg, Al, Fe, Co, and Zn; n is the valence of M ion; x=0.1−10; and y is the number of hydration water molecules). The gel has a buffer action to keep the solution at a constant pH. The stabilized pH balances the ratio of Si to metal ions between solid phase and liquid phase at the time of hydrothermal treatment.

The metal silicate gel should preferably contain Si and metal ions in a ratio (Si/metal ions ratio) of 1.0 to 3.0 because the clay mineral of chain structure usually contains Si and metal ions in a ratio (Si/metal ions ratio) of about 1.5 (depending on the ratio of isomorphous replacement).

The metal silicate gel may be synthesized by a process which involves the steps of neutralizing an aqueous solution of sodium silicate with a mineral acid to give silicic acid, mixing the silicic acid with a water-soluble metal salt (such as magnesium chloride) in an acid pH region to give a uniform aqueous solution, and adding an alkali to this aqueous solution. Examples of the mineral acid used to neutralize an aqueous solution of sodium silicate include hydrochloric acid, sulfuric acid, and nitric acid. The mixing of the silicic acid with the water-soluble metal salt should be carried out at pH 7 or below, preferably pH 3 or below. The alkali should be added to the aqueous solution dropwise in the form of aqueous solution. The amount of the alkali to be added should be such that the solution is at pH 8.0 or above, preferably pH 8.2–9.0, when all the alkali has been added. This is necessary to obtain the gel in good yields. This was experimentally proven as follows: In the case where a magnesium silicate gel is synthesized by the reaction of 0.6 weight % of $SiO_2$ with 0.3 M of magnesium chloride, the resulting gel has an Si/Mg ratio greater than 10 by weight (in other words, the resulting gel is almost silica gel) if the solution is at pH 8 or below when all the alkali has been added, whereas the resulting gel has an Si/Mg ratio of 3/2 (in other words, the resulting gel is a magnesium silicate gel) if the solution is about pH 9 when all the alkali has been added. Moreover, in the case where the pH value is higher than 9.5, the resulting gel is composed of a silicate which has the framework of platy structure rather than chain structure as indicated by its infrared absorption spectrum, in which the absorption (peaks) attributable to the inverted Si-O stretching vibration almost disappears at 1200 cm$^{-1}$. Therefore, it is desirable that the synthesis should be carried out at a pH value lower than 9.5 so that the precursor gel is intended for the synthesis of a clay mineral of chain structure.

The alkali to be added includes, for example, sodium hydroxide and ammonia and so on. The amount of the alkali determines the ratio of Si to metal ions in the silicate gel to be formed. The alkaline solution should have a concentration of 0.01–5 N, preferably 0.05–5 N.

As mentioned above, the silicate gel is formed by the reaction of silicic acid with a water-soluble metal salt. It is considered that this reaction proceeds in the sequence shown below judging from the pH titration curve in the case where the water-soluble metal salt is a magnesium salt.

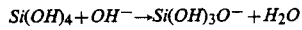

$$Si(OH)_4 + OH^- \rightarrow Si(OH)_3O^- + H_2O$$

This equation represents the reaction of silicic acid with an OH$^-$ ion to give a silicate anion.

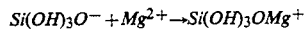

$$Si(OH)_3O^- + Mg^{2+} \rightarrow Si(OH)_3OMg^+$$

This equation represents the reaction of the silicate anion with a Mg$^{2+}$ ion to form a gel.

In the equations shown above, the silicic acid represented by Si(OH)$_4$ includes oligomers formed by the polycondensation of Si(OH)$_4$ in most cases.

The thus synthesized metal silicate gel subsequently undergoes hydrothermal treatment. Before hydrothermal treatment, it should preferably be collected by filtration and washed thoroughly with water to remove sodium salts formed as by-products. It is desirable that sodium salts (such as sodium chloride and sodium sulfate) should be removed as much as possible because they catalyze the decomposition of the clay mineral of chain structure under hydrothermal conditions. Alternatively, the metal silicate gel may be suspended as such, without being dried, in an aqueous solution for hydrothermal treatment.

Incidentally, the metal silicate gel may also be synthesized by the reaction of sodium silicate directly with a water-soluble metal salt in water. However, the above-mentioned process is preferable because of its ability to give a gel of uniform structure.

According to the process of the present invention, the metal silicate gel is suspended and heated (for hydrothermal treatment) in a pH-adjusted aqueous solution containing a clay mineral of chain structure as a seed. Thus there is obtained the desired clay mineral of chain structure.

The reason why the metal silicate gel is suspended in an aqueous solution is that silicic acid and metal ions are easily dissolved at high temperatures and the clay mineral is crystallized easily.

Prior to the hydrothermal treatment, the suspension should be made as uniformly as possible; and during the hydrothermal treatment, the suspension should be stirred continuously.

The aqueous solution, to which the metal silicate is added, contains a clay mineral of chain structure as a seed for crystal growth. The amount of the clay mineral should preferably be 1–50 parts by weight for 100 parts by weight of the metal silicate gel (on dry basis). The hydrothermal treatment should be carried out by continuously stirring the suspension because it involves the heterogeneous reaction between two solids—the gel and the clay mineral of chain structure. If the amount of the clay mineral of chain structure (as nuclei for crystallization) is less than 1 part by weight, the solid-to-solid contact does not take place sufficiently. If the amount exceeds 50 parts by weight, the yield per unit weight of the clay mineral is poor.

The clay mineral of chain structure to be added to the aqueous solution for hydrothermal treatment should preferably be of the same kind as the clay mineral of chain structure to be produced.

The aqueous solution for hydrothermal treatment should not contain any additives (such as cetyltrimethylammonium bromide and 1,8-diaminooctane) which decompose the clay mineral of chain structure.

According to the process of the present invention, the aqueous solution should have a pH value in the range of 3 to 11 measured at room temperature (25° C.). With a pH value under 3, the aqueous solution leaches out metal ions (such as magnesium ions and aluminum ions) from the clay mineral of chain structure, and forming silica gel. With a pH value over 11, the aqueous solution rapidly decomposes the clay mineral of chain structure. The pH value may be properly adjusted by the aid of the buffer action of the metal silicate gel. The use of an ordinary pH buffer such as borate buffer and phosphate buffer is not desirable because they promote the decomposition of clay mineral of chain structure.

According to the process of the present invention, the aqueous suspension of the metal silicate gel should be heated (for hydrothermal treatment) under 350° C. in the presence of liquid phase. Heating above 350° C. causes the clay mineral of chain structure to decompose considerably. The heating temperature should preferably be under 200° C. because sepiolite partly changes into smectite when it undergoes hydrothermal treatment for a long time (say, longer than 50 hours) even at that temperature. However, the metal silicate gel is slow in crystallization under 100° C. Therefore, the most desirable heating temperature ranges from 100 to 200° C.

The hydrothermal treatment should preferably be carried out for 1 to 100 hours.

The aqueous solution for the hydrothermal treatment may be incorporated with a water-soluble magnesium salt, which promotes the crystal growth, permitting the synthesis of the clay mineral of chain structure even at 150° C., as demonstrated in Example 3. The water-soluble magnesium salt is at least one member selected from magnesium chloride, magnesium sulfate, magnesium nitrate and so on.

According to the process of the present invention, it is possible to control the purity, ion exchange capacity, and crystal size of the clay mineral of chain structure.

As mentioned above, the process of the present invention makes it possible to efficiently produce a clay mineral of chain structure. It is considered that the present invention will lend itself to the modification of a natural clay mineral of chain structure and also to the development of a new catalyst. For example, natural brown sepiolite (from Turkey), which has limited applications on account of its color, may be utilized as nuclei for the production of nearly white sepiolite by the hydrothermal treatment.

The invention will be described in more detail with reference to the following examples.

EXAMPLE 1

In 840 ml of distilled water was dissolved 15.12 g of sodium orthosilicate (made by Nacalai Tesque Co., Ltd.). The resulting solution was adjusted to pH 3.0 with 4 N hydrochloric acid which was added dropwise. In the solution was dissolved 48.9 g of magnesium chloride hexahydrate. To the solution was added dropwise with stirring 41 ml of 1N sodium hydroxide for 3 hours. After aging overnight, the resulting gel was separated by filtration, followed by rinsing five times with water. The thus obtained gel (250 mg on dry basis) was suspended, together with 73 mg of sepiolite from Eski Chehir in Turkey, in 60 ml of distilled water. The suspension was placed in a stainless steel pressure vessel containing two alumina balls 1 cm in diameter. The suspension was heated at 200° C. for 14 hours during which the vessel was oscillated at 20 rpm. After cooling to room temperature, the reaction product was collected by filtration. The collected product was washed three times with distilled water and vacuum-dried at 60° C. overnight.

The product was examined by powder X-ray diffraction. There was obtained a chart shown in FIG. 1. The product was found to contain 160 mg of sepiolite from the (110) peak height for d=12.1 Å, with Si being the internal standard. This suggests the crystal growth of sepiolite. The crystal growth of sepiolite was also confirmed by the amount of heat absorbed by bound water molecules at 250°–350° C. in differential thermal analysis.

EXAMPLE 2

Sepiolite was prepared in the same manner as in Example 1, except that the hydrothermal treatment was carried out for 40 hours. The reaction product gave a chart of powder X-ray diffraction as shown in FIG. 2. The chart apparently indicates that the product is sepiolite resulting from crystal growth.

EXAMPLE 3

In 60 ml of deionized water were suspended 0.326 g (on dry basis) of magnesium silicate gel prepared in the same manner as in Example 1, 76 mg of natural sepiolite from Turkey, and 20.2 g of magnesium sulfate heptahydrate by the aid of ultrasonication. The resulting suspension was placed in a 100-ml TEFLON(polytetrafluoroethylene)-lined stainless steel pressure vessel containing three alumina balls 1 cm in diameter. The suspension was heated at 150° C. for 95 hours during which the vessel was oscillated at 20 rpm. After cooling to room temperature, the reaction product was washed with water and vacuum-dried at 60° C. overnight. The product was found to contain 127 mg of sepiolite by X-ray diffraction, with Si being the internal standard. This indicates the synthesis of sepiolite.

COMPARATIVE EXAMPLE 1

In 60 ml of deionized water was suspended 0.280 g (on dry basis) of magnesium silicate gel prepared in the same manner as in Example 1. (Natural sepiolite was not added.) The resulting suspension was placed in a 100-ml TEFLON(polytetrafluoroethylene)-lined stainless steel pressure vessel containing three alumina balls 1 cm in diameter. Hydrothermal treatment was carried out at 200° C. for 50 hours during which the vessel was oscillated. The reaction product was found to be fibrous by observation under a transmission electron microscope; however, it was also found to contain only a small amount of sepiolite by X-ray diffraction.

COMPARATIVE EXAMPLE 2

In 60 ml of distilled water were suspended 0.250 g (on dry basis) of magnesium silicate gel prepared in the same manner as in Example 1 and 73 mg of natural sepiolite from Turkey. The resulting suspension was filtered without being subjected to hydrothermal treatment, and the collected product was dried at 60° C. overnight. The product gave a chart of powder X-ray diffraction as shown in FIG. 3. The chart shows the sepiolite peak with low intensity. The result of determination using Si as the internal standard indicated that the amount of sepiolite did not increase.

COMPARATIVE EXAMPLE 3

A suspension containing 0.27 g (on dry basis) of magnesium silicate gel prepared in the same manner as in Example 1 and 80 mg of natural sepiolite from Turkey was subjected to hydrothermal treatment at 400° C. for 20 hours. The reaction product was found to be smectite by powder X-ray diffraction.

COMPARATIVE EXAMPLE 4

In 60 ml of deionized water were suspended 0.25 g (on dry basis) of magnesium silicate gel prepared in the same manner as in Example 1 and 72 mg of natural sepiolite from Turkey. To the suspension was added 0.55 g of cetyltrimethylammonium bromide, followed by reaction at 200° C. for 14 hours. The reaction product gave an infrared absorption spectrum in which the C-H stretching vibration appeared at 2950 cm$^{-1}$. It also gave an X-ray diffraction pattern of smectite. It is considered to be an intercalation compound of smectite-cetyltrimethylammonium ion.

COMPARATIVE EXAMPLE 5

In 60 ml of deionized water were suspended 0.25 g (on dry basis) of magnesium silicate gel prepared in the same manner as in Example 1 and 72 mg of natural sepiolite from Turkey. To the suspension was added 0.87 g of sodium dodecyl sulfate, followed by stirring at 200° C. for 14 hours. The reaction product gave an infrared absorption spectrum in which an absorption peak appeared at 1100 cm$^{-1}$. This indicates that the product is composed mainly of silica gel. This is considered to have occurred because magnesium ions in sepiolite were leached out by the acid.

Table below shows the yields of sepiolite (based on the amount of sepiolite added as a seed) in Examples and Comparative Examples.

TABLE

| | Example No. | | | Comparative Example No. | | | | |
|---|---|---|---|---|---|---|---|---|
| | 1 | 2 | 3 | 1 | 2 | 3 | 4 | 5 |
| Yields (%) | 75 | 81 | 81 | * | 0 | 0 | 0 | 0 |

*Less than 2% based on the weight (dry basis) of gel added as the starting material.

What is claimed is:

1. A process for producing a clay mineral of chain structure which comprises suspending a metal silicate gel in an aqueous solution which has a pH value of 3-11 at room temperature and contains a clay mineral of chain structure suspending therein, and then heating the resulting suspension at a temperature below 350° C.

2. A process for producing a clay mineral of chain structure as claimed in claim 1, wherein the clay mineral of chain structure is at least one of sepiolite and attapulgite.

3. A process for producing a clay mineral of chain structure as claimed in claim 1, wherein the metal silicate gel is one which is presented by the formula $SiM_{x}O_{2+nx/2} \cdot yH_2O$) M denotes a metal element which takes on the six-coordination; n is the valence of M ion; x=0.1—10; and y is the number of hydration water molecules.

4. A process for producing a clay mineral of chain structure as claimed in claim 1, wherein the metal silicate gel contains silicon (Si) and metal salt in a molar ratio (Si/metal ions) of 1.0 to 3.0.

5. A process for producing a clay mineral of chain structure as claimed in claim 1, wherein the metal silicate gel is one which is synthesized by neutralizing an aqueous solution of sodium silicate with a mineral acid to give silicic acid, mixing the silicic acid with a water-soluble metal salt in an acid region to give an aqueous solution, and adding an alkali to the aqueous solution.

6. A process for producing a clay mineral of chain structure as claimed in claim 5, wherein the silicic acid and water-soluble metal salt are mixed in an acid region of pH 3 or below.

7. A process for producing a clay mineral of chain structure as claimed in claim 5, wherein the alkali is added to the aqueous solution such that the solution is adjusted to pH 8.0–9.5 when the addition of the alkali is completed.

8. A process for producing a clay mineral of chain structure as claimed in claim 1, wherein the clay mineral of chain structure suspended in the aqueous solution amounts to 1-50 parts by weight for 100 parts by weight on dry basis of the metal silicate gel.

9. A process for producing a clay mineral of chain structure as claimed in claim 1, wherein the aqueous solution is incorporated with a water-soluble magnesium salt.

10. A process for producing a clay mineral of chain structure as claimed in claim 9, wherein the water-soluble magnesium salt is at least one member selected from the group consisting of magnesium chloride, magnesium sulfate, and magnesium nitrate.

11. A process for producing a clay mineral of chain structure as claimed in claim 1, wherein the suspension is heated at 100°–200° C.

12. A process for producing a clay mineral of chain structure as claimed in claim 1, wherein the suspension is heated for 1-100 hours.

13. A clay mineral of chain structure which is prepared by suspending a metal silicate gel in an aqueous solution which has a pH value of 3-11 at room temperature and contains a clay mineral of chain structure suspending therein, and then heating the resulting suspension at a temperature below 350° C.

14. A process for producing a clay mineral of chain structure as claimed in claim 1, wherein the metal silicate gel is amorphous.

* * * * *